Patented Aug. 28, 1934

1,971,668

UNITED STATES PATENT OFFICE 1,971,668

PROCESS FOR THE PRODUCTION OF MONO-BASIC ALUMINUM SULPHITE

Erich Wiedbrauck and Karl Büche, Essen-Ruhr, Germany, assignors to firm Th. Goldschmidt A.-G., Essen-Ruhr, Germany No Drawing. Application January 23, 1933, Serial No. 653,171. In Germany January 25, 1932

21 Claims. (Cl. 23—129)

This invention relates to a process for the production of monobasic aluminum sulphite.

The technical solutions—usually containing free sulphur dioxide—of aluminum sulphites obtained by the action of aqueous sulphurous acid on aluminiferous minerals, aluminum hydroxide or other aluminiferous compounds, or by converting technical grades of aluminum salts with the aid of sulphites, or by any other means, are always contaminated by extraneous constituents. Considerable difficulty is experienced in preparing from such solutions pure aluminum compounds which meet all requirements with regard to quality, especially freedom from silica and iron.

Attempts have already been made to produce basic aluminum compounds, free from impurities, from technical aluminum sulphite liquors, by simple hydrolysis, that is, by removing the sulphurous acid present in the solution. So far as their iron content is concerned, the aluminum compounds obtained in this extremely simple way are often satisfactory, provided certain precautions, such as exclusion of air, are observed. Nevertheless, they always contain considerable amounts of silica, according to the nature of the original solution and ranging up to 10 per cent (referred to $Al_2O_3$), which preclude their employment for most purposes, and especially for the manufacture of metallic aluminum.

Attempts have also been made to separate the silica from the alumina in a suitable manner. For instance, fractional precipitation, or fractional hydrolysis, and the method of repeatedly dissolving and reprecipitating the basic aluminum sulphite first obtained, have been tried. In all these operations the hydrolysis was brought about by removing the sulphurous acid from the liquors, for example by boiling or evacuation.

The basic aluminum sulphites thereby obtained are, for the most part, compounds without fixed crystalline structure and composition. Depending on the conditions of precipitation, they contain larger or smaller amounts of free sulphurous acid, and $SO_2$ and $Al_2O_3$ occur in these compounds rarely in simple molecular proportions. For instance, it is very difficult to obtain the only known dibasic salt: $Al_2O_3.SO_2.4H_2O$, which was first prepared by Goggingsberg. On page 61 of his book "Die Darstellung von Bisulphiten und Sulphiten" Schütz states that only a single salt, namely the dibasic aluminum sulphite, exists.

Applicants have found, surprisingly, that there is also a monobasic aluminum sulphite, which takes the form of a solid, crystalline compound which always contains, in addition to water, 2 molecules of $SO_2$ to 1 molecule of alumina. This substance was hitherto entirely unknown.

The monobasic aluminum sulphite is formed when aluminum sulphite solutions are heated under conditions under which they completely or partially retain their $SO_2$ content, the presence of at least 2 molecules of $SO_2$ to 1 molecule of $Al_2O_3$ being essential. A pure crystalline monobasic aluminum sulphite, separates out from the solutions, the yield being almost quantitative.

Retaining the $SO_2$ content of the aluminum sulphite solution is achieved in the simplest manner, for example by heating the solution in a closed vessel under pressure. The operation may also be conducted without the application of pressure, in which event, the ratio of alumina to sulphurous acid, within a definite temperature range, must always be such that an adequate amount of sulphurous acid—that is, at least 2 molecules of $SO_2$ to 1 molecule of $Al_2O_3$—is present throughout the formation of the monobasic aluminum sulphite.

If an aluminum sulphite solution be heated in a closed vessel, and therefore under $SO_2$ pressure, the prescribed condition for the formation of monobasic aluminum sulphite is directly fulfilled, since no sulphurous acid can escape.

The operation can also be conducted by first expelling a portion of the free $SO_2$, usually present in the aluminum sulphite solutions, by suitable means such as warming the solution, evacuation and so forth, and then heating these solutions, which have been impoverished in $SO_2$, in closed vessels under pressure. The deposition of the monobasic aluminum sulphite solutions begins at temperatures above 60° C., and proceeds more rapidly as the temperature rises. For example, it is complete in 45 minutes at 100° C., about 95 per cent of the alumina originally dissolved as sulphite being deposited.

The conditions are different when the heating is conducted in open vessels, that is, without pressure, since in such case the sulphurous acid can escape. Although sulphites are likewise formed, unless special precautions be taken, these sulphites are highly basic, as a rule, owing to the comparatively small amounts of sulphurous acid available. In such case, the temperature at which the reaction occurs can be maintained at such a level that sufficient sulphurous acid for the formation of the monobasic sulphite is available throughout the entire reaction period. This condition is fulfilled by operating at deposition temperatures not exceeding 90° C. The influence of the deposition temperature on the composition of the resulting deposition product is shown by the following experimental figures.

| Deposition temperatures ° C. | Composition of the reaction product— | |
|---|---|---|
| | mol $Al_2O_3$ | mol $SO_2$ |
| 65° | 1 | 2 |
| 75° | 1 | 2 |
| 80° | 1 | 2 |
| 85° | 1 | 2 |
| 90° | 1 | 1.65 |
| 95° | 1 | 0.82 |
| 100° | 1 | .64 |

The monobasic aluminum sulphite obtained by deposition under pressure, or without pressure, is a very pure compact, crystalline salt. Its composition, in the moist state after suction filtration, is usually as folows:—

|  | Per cent |
|---|---|
| $Al_2O_3$ | 25–27 |
| $SO_2$ | 29–32 | the remainder being water.

In drying, the salt loses about 19 to 21 per cent of water, the dry salt containing, for example:—

|  | Per cent |
|---|---|
| $Al_2O_3$ | 30.72 |
| $SO_2$ | 38.43 | remainder water.

The new salt is comparatively stable, sparingly soluble in water, soluble in aqueous solutions of $SO_2$, and soluble in acids, $SO_2$ being liberated. It reacts with alkaline substances. On heating, $SO_2$ is given off.

*Example 1*

A solution containing 51.1 grams of $Al_2O_3$ and 192.6 grms. of $SO_2$ per litre is heated to 70° C., the excess of $SO_2$ beyond 117.3 grms. per litre in the solution being driven off. The solution treated in this manner is heated for 3 hours in a closed, lead-lined autoclave, the pressure rising to 3–4 atmospheres. After cooling, the deposited monobasic aluminum sulphite is filtered off, leaving the solution still containing 4.5 grms. of $Al_2O_3$ per litre. Consequently, 91.2 per cent of the alumina originally present is recovered as monobasic aluminum sulphite.

*Example 2*

A solution containing 33 grms. of $Al_2O_3$ and 134 grms. of $SO_2$ per litre is heated at 115° C. for 45 minutes in a closed, lead-lined autoclave agitator, the pressure rising to 7 atmospheres. The reaction mixture is treated in the same manner as in Example 1. The filtrate still contains 1.4 grms. of $Al_2O_3$ per litre, corresponding to a deposition of more than 95 per cent.

*Example 3*

An aluminum sulphite solution containing 4.22 per cent of $Al_2O_3$ and 18.3 per cent of $SO_2$ is slowly heated to 82.5° C. in an open, lead-lined stirring vessel, $SO_2$ being liberated. After a short time (about 30 minutes), deposition of monobasic aluminum sulphite commences, and the deposition is complete at the end of several hours. The granular salt can be easily separated from the mother liquor—which still contains 0.34 per cent of $Al_2O_3$—by suction filtration. Yield, 92 per cent.

It has also been ascertained that a pure aluminum compound can be obtained from impure aluminum sulphite liquors by treating them in accordance with the present process for the production of monobasic aluminum sulphite, the monobasic sulphite of well-defined composition in respect to $SO_2$ and $Al_2O_3$ being deposited. This aluminum sulphite is practically free from $SiO_2$ and is also very low in iron. In order to reduce this low iron content still further, the deposited monobasic aluminum sulphite can be redissolved in aqueous sulphurous acid, and then redeposited from the solution by heating under conditions enabling the $SO_2$ content to be completely or partially retained.

In order to eliminate the silica and iron from the aluminum sulphite liquors in a practically complete manner, by simply expelling the $SO_2$, the above described mixture—low in $SO_2$—of aluminum compounds can first be produced in the usual manner. This mixture is then dissolved in aqueous sulphurous acid, whereupon the monobasic aluminum sulphite is deposited from the solution by heating under conditions completely or partially maintaining the $SO_2$ content. The deposited compact, granular salt, after washing with water, is of a high degree of purity. The residual, sulphurous mother liquors contain all the impurities, especially the iron and silica, and they may be employed, for example, for decomposing further quantities of aluminous compounds. In order to minimize heat consumption in this recrystallization, it is advisable to employ concentrated aqueous sulphurous acid in dissolving the deposited basic aluminum sulphite mixture containing a small amount of $SO_2$. In this manner, aluminum sulphite solutions with up to 170 grms. of $Al_2O_3$ per litre can be obtained.

One advantage of the deposition process of the present invention consists in that the consumption of heat is considerably smaller than in the method of deposition by boiling off the $SO_2$, which is accompanied by the evaporation of a not inconsiderable amount of water. The almost quantitative deposition of the monobasic aluminum sulphite requires only a short heating of the liquor, at 80° C. for example, in a closed autoclave, without any evaporation of liquid being needed. This point is important in relation to the treatment of the dilute aluminum sulphite liquors usually obtained industrially.

It has also been observed that the density of the deposited monobasic aluminum sulphite increases with rising deposition temperature. This is particularly noticeable when the resulting monobasic aluminum sulphite is calcined for the production of alumina, as is shown by the following experimental examples:

Specific gravity of alumina—in the loose state—prepared by calcining:

(1) Basic aluminum sulphite mixture, low in $SO_2$ _____ 0.48
(2) Monobasic aluminum sulphite, deposited at 80° C _____ 0.77
(3) Monobasic aluminum sulphite, deposited at 115° C _____ 1.14

Apart from the deposition temperature, the grain size of the deposited monobasic aluminum sulphite is influenced by such factors as agitation, rate and duration of stirring, concentration of the solution in respect to $Al_2O_3$ and $SO_2$, etc. Hence, by selecting the conditions of deposition a finer or coarser monobasic aluminum sulphite—and therefore alumina as well—can be obtained at will.

Example 4

A solution obtained by decomposing clay with aqueous sulphurous acid, gave the following composition:—

|  | Per cent |
|---|---|
| $Al_2O_3$ | 3.31 |
| $Fe_2O_3$ | 0.30 |
| $SO_2$ | 15.40 |
| $SO_3$ | 0.21 and |
| $SiO_2$ | 0.020 | all by volume.

The solution is warmed, at ordinary pressure, to 70° C., the free $SO_2$ being allowed to escape. The solution is then heated at 90° C. in a lead-lined autoclave for 1 hour, the pressure reaching about 4–5 atmospheres. After cooling, the deposited salt is filtered off and washed with water, and has the following composition in the moist state:

|  | Per cent |
|---|---|
| $Al_2O_3$ | 24.93 |
| $SO_2$ | 29.89 |
| $SO_3$ | 0.85 |
| $Fe_2O_3$ | 0.11 |
| $SiO_2$ | 0.00 |

Referred to 100 parts of alumina, the impurities have therefore decreased from:—

10.0 parts of $Fe_2O_3$ in the solution to 0.44 in the salt 0.61 parts of $SiO_2$ in the solution to 0.00 in the salt Approximately 95 per cent of the alumina originally present has been deposited, as monobasic aluminum sulphite, from the liquor.

The resulting monobasic aluminum sulphite, which still contains 0.11 per cent of $Fe_2O_3$, is redissolved in aqueous sulphurous acid, and the solution is reheated to 100° C., in the pressure autoclave. After cooling, the deposited salt is filtered off and washed, and now contains only 0.008 per cent of iron.

Example 5

The following basic aluminum sulphite is obtained by boiling an aluminum sulphite liquor:

|  | Per cent |
|---|---|
| $Al_2O_3$ | 14.39 |
| $Fe_2O_3$ | 0.04 |
| $SiO_2$ | 0.14 |
| $SO_2$ | 5.18 |
| $SO_3$ | 1.06 |

Of this damp salt, 250 grms. are dissolved at 20° C. with 800 grms. of water and 200 grms. of $SO_2$, the excess of the latter being expelled by heating up to 70° C. The solution is then heated at 100° C. (pressure 5–6 atmospheres) for 1 hour in an acidproof autoclave. The filtered and washed monobasic aluminum sulphite has the following composition while in the moist state in which it leaves the suction filter:

|  | Per cent |
|---|---|
| $Al_2O_3$ | 25.44 |
| $SO_2$ | 30.50 |
| $SO_3$ | 0.83 |
| $Fe_2O_3$ | 0.002 |
| $SiO_2$ | 0.01 |

Referred to 100 parts of alumina, the impurities have therefore decreased by the redeposition, from 0.28 parts of $Fe_2O_3$ in the original product to 0.0078 in the redeposited salt; 0.97 parts of $SiO_2$ in the original product to 0.04 in the redeposited salt. The yield of alumina exceeded 95 per cent.

What we claim as our invention and desire to secure by Letters Patent is:—

1. A process for the production of monobasic aluminum sulphite which comprises heating aluminum sulphite solutions under conditions wholly maintaining the $SO_2$ content and in which at least two molecules of $SO_2$ are present to one molecule of $Al_2O_3$, until the monobasic aluminum sulphite is deposited from the solution.

2. A process for the production of monobasic aluminum sulphite which comprises heating aluminum sulphite solutions under conditions partially maintaining the $SO_2$ content and in which at least two molecules of $SO_2$ are present to one molecule of $Al_2O_3$, until the monobasic aluminum sulphite is deposited from the solution.

3. A process for the production of monobasic aluminum sulphite which comprises heating aluminum sulphite solutions under conditions wholly maintaining the $SO_2$ content and in which at least two molecules of $SO_2$ are present to one molecule of $Al_2O_3$, until the monobasic aluminum sulphite is deposited from the solutions, redissolving said basic aluminum sulphite which still contains iron, in aqueous sulphurous acid and redepositing it from the solution by heating under conditions wholly maintaining the $SO_2$ content.

4. A process for the production of monobasic aluminum sulphite which comprises heating aluminum sulphite solutions under conditions wholly maintaining the $SO_2$ content and in which at least two molecules of $SO_2$ are present to one molecule of $Al_2O_3$, until the monobasic aluminum sulphite is deposited from the solutions, redissolving said basic aluminum sulphite which still contains iron, in aqueous sulphurous acid and redepositing it from the solution by heating under conditions partially maintaining the $SO_2$ content, at least two molecules of $SO_2$ being present for each molecule of $Al_2O_3$ during said redeposition.

5. A process for the production of monobasic aluminum sulphite which comprises heating aluminum sulphite solutions under conditions partially maintaining the $SO_2$ content and in which at least two molecules of $SO_2$ are present to one molecule of $Al_2O_3$, until the monobasic aluminum sulphite is deposited from the solutions, redissolving said basic aluminum sulphite which still contains iron, in aqueous sulphurous acid and redepositing it from the solution by heating under conditions wholly maintaining the $SO_2$ content.

6. A process for the production of monobasic aluminum sulphite which comprises heating aluminum sulphite solutions under conditions partially maintaining the $SO_2$ content and in which at least two molecules of $SO_2$ are present to one molecule of $Al_2O_3$, until the monobasic aluminum sulphite is deposited from the solutions, redissolving said basic aluminum sulphite which still contain iron, in aqueous sulphurous acid and redepositing it from the solution by heating under conditions partially maintaining the $SO_2$ content, at least two molecules of $SO_2$ being present for each molecule of $Al_2O_3$ during said redeposition.

7. A process for the production of monobasic aluminum sulphite which comprises depositing basic aluminum sulphite mixtures low in SO$_2$ from aluminum sulphite solutions by hydrolytic separation, redissolving the deposition in concentrated or dilute aqueous sulphurous acid and heating the solution under conditions wholly maintaining the SO$_2$ content in which solution at least two molecules of SO$_2$ are present to one molecule of Al$_2$O$_3$.

8. A process for the production of monobasic aluminum sulphite which comprises depositing basic aluminum sulphite mixtures low in SO$_2$ from aluminum sulphite solutions by hydrolytic separation, redissolving the deposition in concentrated or dilute aqueous sulphurous acid and heating the solution under conditions partially maintaining the SO$_2$ content in which solution at least two molecules of SO$_2$ are present to one molecule of Al$_2$O$_3$.

9. A process for the production of pure monobasic aluminum sulphite of definite granular size, which comprises heating aluminum sulphite solutions at temperatures ranging between about 70° and 150° C. under conditions wholly maintaining the SO$_2$ content and in which at least two molecules of SO$_2$ are present to one molecule of Al$_2$O$_3$ until the monobasic aluminum sulphite is deposited from the solutions.

10. A process for the production of pure monobasic aluminum sulphite of definite granular size, which comprises heating aluminum sulphite solutions at temperatures ranging between about 70° and 150° C. under conditions partially maintaining the SO$_2$ content and in which at least two molecules of SO$_2$ are present to one molecule of Al$_2$O$_3$ until the monobasic aluminum sulphite is deposited from the solutions.

11. In the process of making monobasic aluminum sulphite, the step which comprises heating a solution of aluminum sulphite containing at least two molecules of SO$_2$ for each molecule of Al$_2$O$_3$, under atmospheric pressure, to temperatures below 90° C. and under conditions maintaining a molecular ratio of at least 2 to 1 between SO$_2$ and Al$_2$O$_3$, thereby precipitating said monobasic aluminum sulphite.

12. The process of claim 1 wherein the aluminum sulphite solutions heated are impure products containing silica and iron as impurities.

13. The process of claim 2 wherein the aluminum sulphite solutions heated are impure products containing silica and iron as impurities.

14. The process of claim 3 wherein the aluminum sulphite solutions heated are impure products containing silica and iron as impurities.

15. The process of claim 4 wherein the aluminum sulphite solutions heated are impure products containing silica and iron as impurities.

16. The process of claim 5 wherein the aluminum sulphite solutions heated are impure products containing silica and iron as impurities.

17. The process of claim 6 wherein the aluminum sulphite solutions heated are impure products containing silica and iron as impurities.

18. The process of claim 7 wherein the basic aluminum sulphite is deposited from impure solutions containing silica and iron as impurities.

19. The process of claim 8 wherein the basic aluminum sulphite is deposited from impure solutions containing silica and iron as impurities.

20. The process of claim 9 wherein the aluminum sulphite solutions heated are impure products containing silica and iron as impurities.

21. The process of claim 10 wherein the aluminum sulphite solutions heated are impure products containing silica and iron as impurities.

ERICH WIEDBRAUCK.
KARL BÜCHE.